United States Patent
Balasubramanyam et al.

(10) Patent No.: US 9,612,817 B2
(45) Date of Patent: Apr. 4, 2017

(54) SYSTEM AND METHOD FOR PROVIDING A PHYSICAL PLUGIN FOR USE IN A CLOUD PLATFORM ENVIRONMENT

(71) Applicant: ORACLE INTERNATIONAL CORPORATION, Redwood Shores, CA (US)

(72) Inventors: Yamini K Balasubramanyam, Bangalore (IN); Joseph Dipol, Santa Clara, CA (US); Nazrul Islam, Santa Clara, CA (US); Rajiv Mordani, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/515,347

(22) Filed: Oct. 15, 2014

(65) Prior Publication Data
US 2015/0121375 A1   Apr. 30, 2015

Related U.S. Application Data

(60) Provisional application No. 61/897,718, filed on Oct. 30, 2013.

(51) Int. Cl.
G06F 9/44      (2006.01)
G06F 9/445    (2006.01)
H04L 12/911  (2013.01)
G06F 9/455    (2006.01)

(52) U.S. Cl.
CPC ............ *G06F 8/61* (2013.01); *G06F 8/65* (2013.01); *G06F 9/45533* (2013.01); *H04L 47/70* (2013.01)

(58) Field of Classification Search
CPC ................................................. G06F 8/65
USPC .............................................. 717/168
See application file for complete search history.

(56) References Cited

U.S. PATENT DOCUMENTS

| | | | |
|---|---|---|---|
| 8,627,426 B2 * | 1/2014 | Lucovsky et al. | 726/7 |
| 8,893,114 B1 * | 11/2014 | Cooley | 717/173 |
| 8,990,813 B2 * | 3/2015 | Frields et al. | 718/100 |
| 2014/0109055 A1 * | 4/2014 | Gibbens et al. | 717/125 |
| 2014/0109056 A1 * | 4/2014 | Schissel et al. | 717/125 |

OTHER PUBLICATIONS

"Oracle Virtual Assembly Builder (OVAB) Overview"; Oracle.com website as captured by the Wayback Machine Internet Archive (archive.org) on Sep. 17, 2013.*

* cited by examiner

*Primary Examiner* — Qing Chen
*Assistant Examiner* — Clint Thatcher
(74) *Attorney, Agent, or Firm* — Tucker Ellis LLP

(57) ABSTRACT

In accordance with an embodiment, described herein are systems and methods for simulating a cloud environment on a physical platform. In an embodiment, a physical assembly is provided within a cloud environment and a physical plug-in configured to provide a virtual assembly builder-like environment on a physical platform. The physical assembly is an installable software suite including software configured to support provisioning of applications for providing services. The physical plug-in is configured to enable installation of the physical assembly on the physical platform. The physical plug-in is also configured to enable support for administering the services of the cloud platform component via the software installed from the physical assembly.

20 Claims, 12 Drawing Sheets

US 9,612,817 B2

SYSTEM AND METHOD FOR PROVIDING A PHYSICAL PLUGIN FOR USE IN A CLOUD PLATFORM ENVIRONMENT

CLAIM OF PRIORITY

This application claims the benefit of priority to U.S. Provisional Application titled "SYSTEM AND METHOD FOR PROVIDING A PHYSICAL PLUGIN FOR USE IN A CLOUD PLATFORM ENVIRONMENT", Application No. 61/897,718, filed Oct. 30, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing, and providing of services within such environments, and are particularly related to systems and method for simulating a cloud environment on a physical platform including one or more physical machines.

BACKGROUND

A typical cloud computing environment may utilize a number of virtualized platforms deployed to one or more physical machines, and connected through a network such as the Internet. A virtualized environment provides the benefit of being scalable without affecting the end user. A virtualized environment can also provide high isolation between the services deployed therein, since the services run within their own virtual machine and are highly partitioned.

However, computer hardware for supporting such virtual environments can be costly. Establishing a virtual environment for developing, evaluating, testing and demonstrating services for subsequent deployment within a cloud environment can be complex and require significant investment. It would be beneficial to lower the pre-deployment cost of developing services and assemblies for use in a cloud environment, by providing the ability to develop, evaluate, test and demonstrate an assembly before committing virtualized resources. These are some examples of the types of environment in which embodiments of the invention can be used.

SUMMARY

In accordance with an embodiment, described herein are systems and methods for simulating a cloud environment on a physical platform. In an embodiment, a physical assembly is provided within a cloud environment and a physical plug-in configured to provide a virtual assembly builder-like environment on a physical platform. The physical assembly is an installable software suite including software configured to support provisioning of applications for providing services. The physical plug-in is configured to enable installation of the physical assembly on the physical platform. The physical plug-in is also configured to enable support for administering the services of the cloud platform component via the software installed from the physical assembly.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
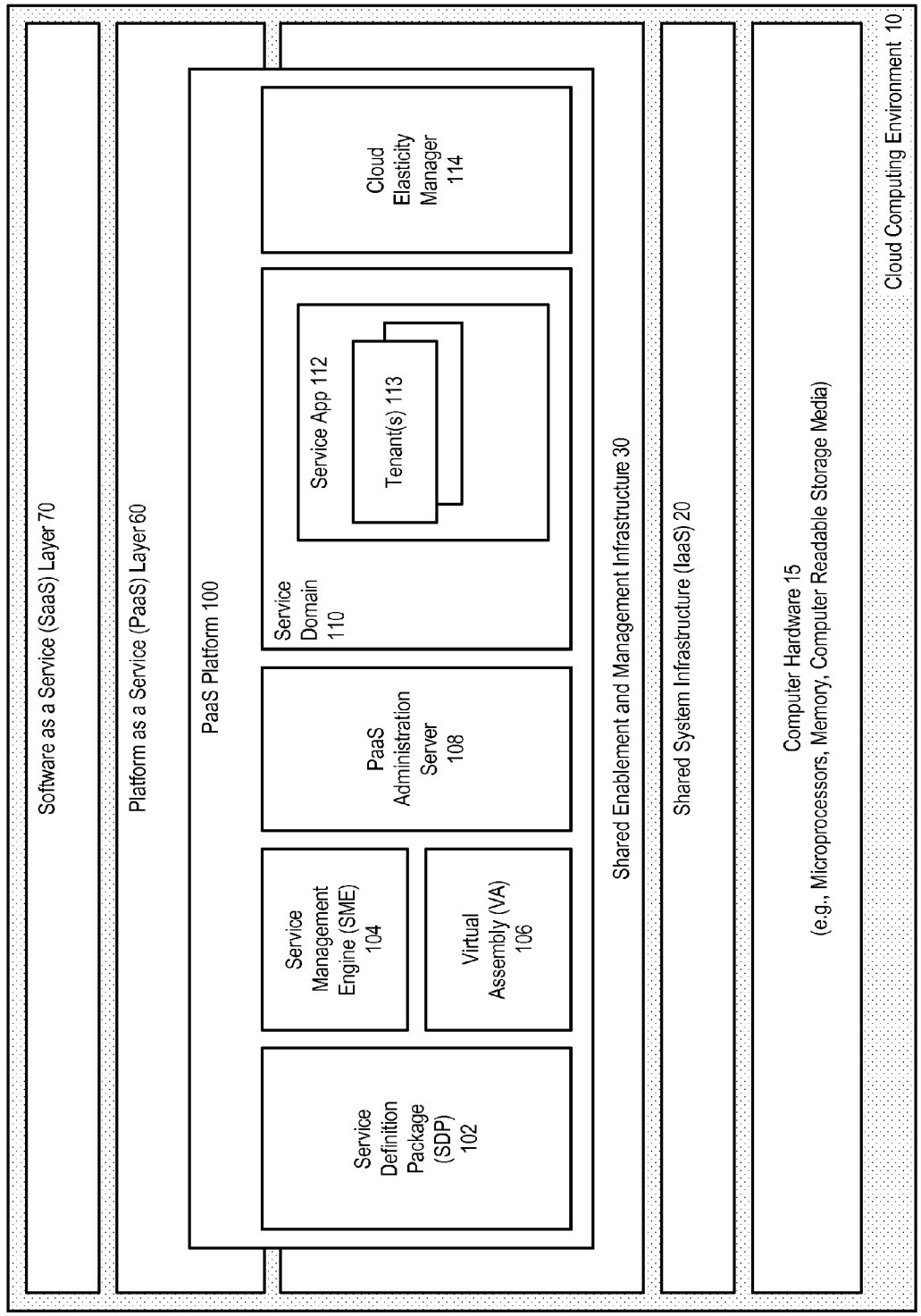
FIG. 1 illustrates an example of a cloud computing environment, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic):

In accordance with an embodiment, a PaaS platform component is an installable software suite that provides a self-service provisioning experience for enterprise applications, such as FMW or other enterprise applications.

Site:

In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant:

In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-Tenant:

In Accordance with an Embodiment, a Sub-Tenant is an Entity that Exists Under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package:

In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine:

In accordance with an embodiment, a service management engine (SME) provides a generic means to plug any service type into the system. For example, an SME takes care of the service-specific provisioning, lifecycle, management, and monitoring support for a service type or provider type.

Service Type:

In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment:

In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service:

In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type:

In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider:

In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource:

In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime:

In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type:

In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource:

In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota:

In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces:

In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role):

In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role):

In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role):

In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role):

In accordance with an embodiment, a Service Administrator is responsible for administering and managing a specific service after it has been provisioned. A Service Administrator interacts with the service's administration interface to perform administration and management operations.

Service Runtime Administrator (Role):

In accordance with an embodiment, a Service Runtime Administrator is responsible for configuring and managing service runtimes.

Application Deployer (Role):

In accordance with an embodiment, an Application Deployer deploys an application to the provisioned service, and is responsible for installing, configuring, and running the application. Once the application is running, it can be made available to an End User.

End User (Role):

In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
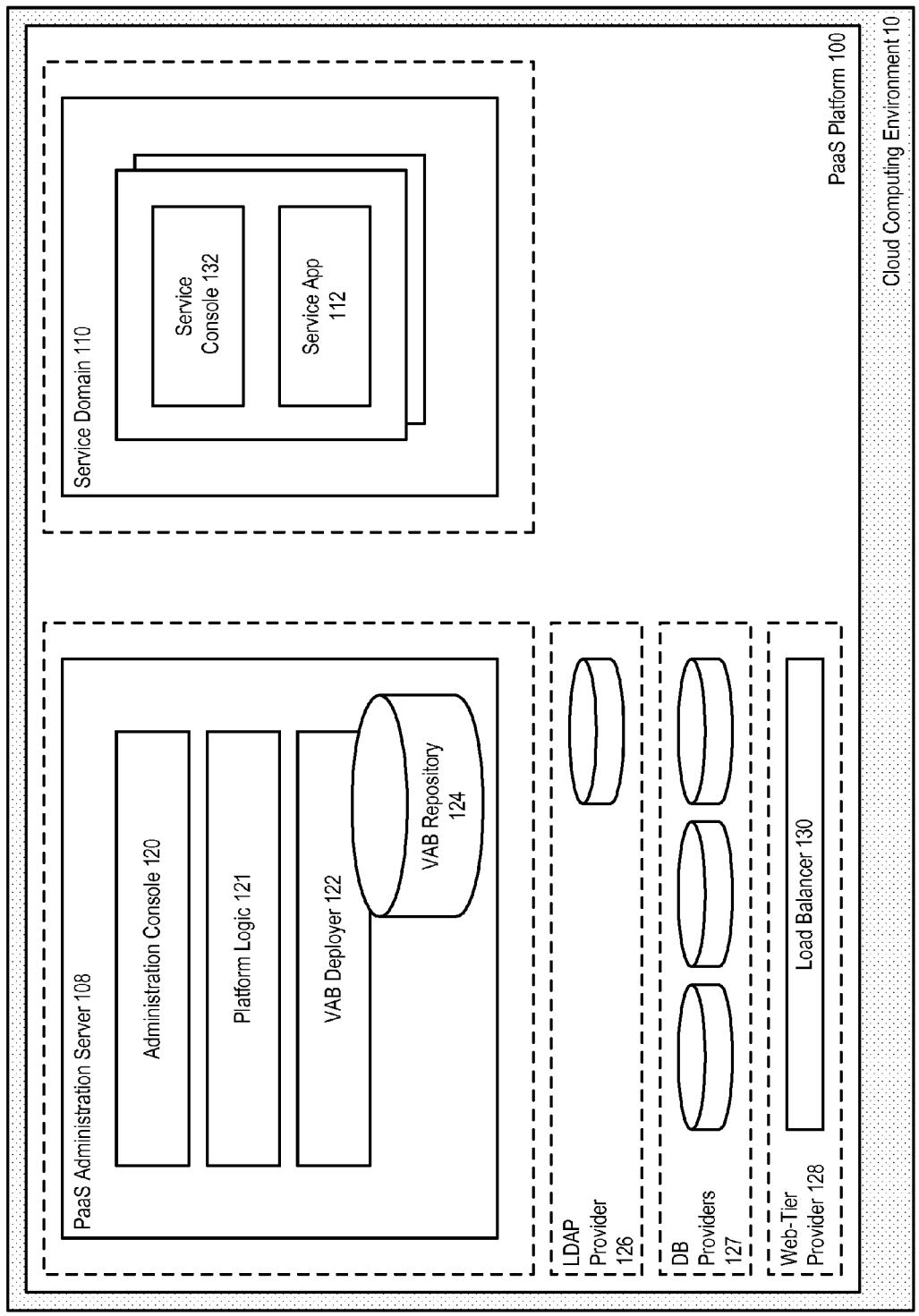
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and load-balancer 128 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
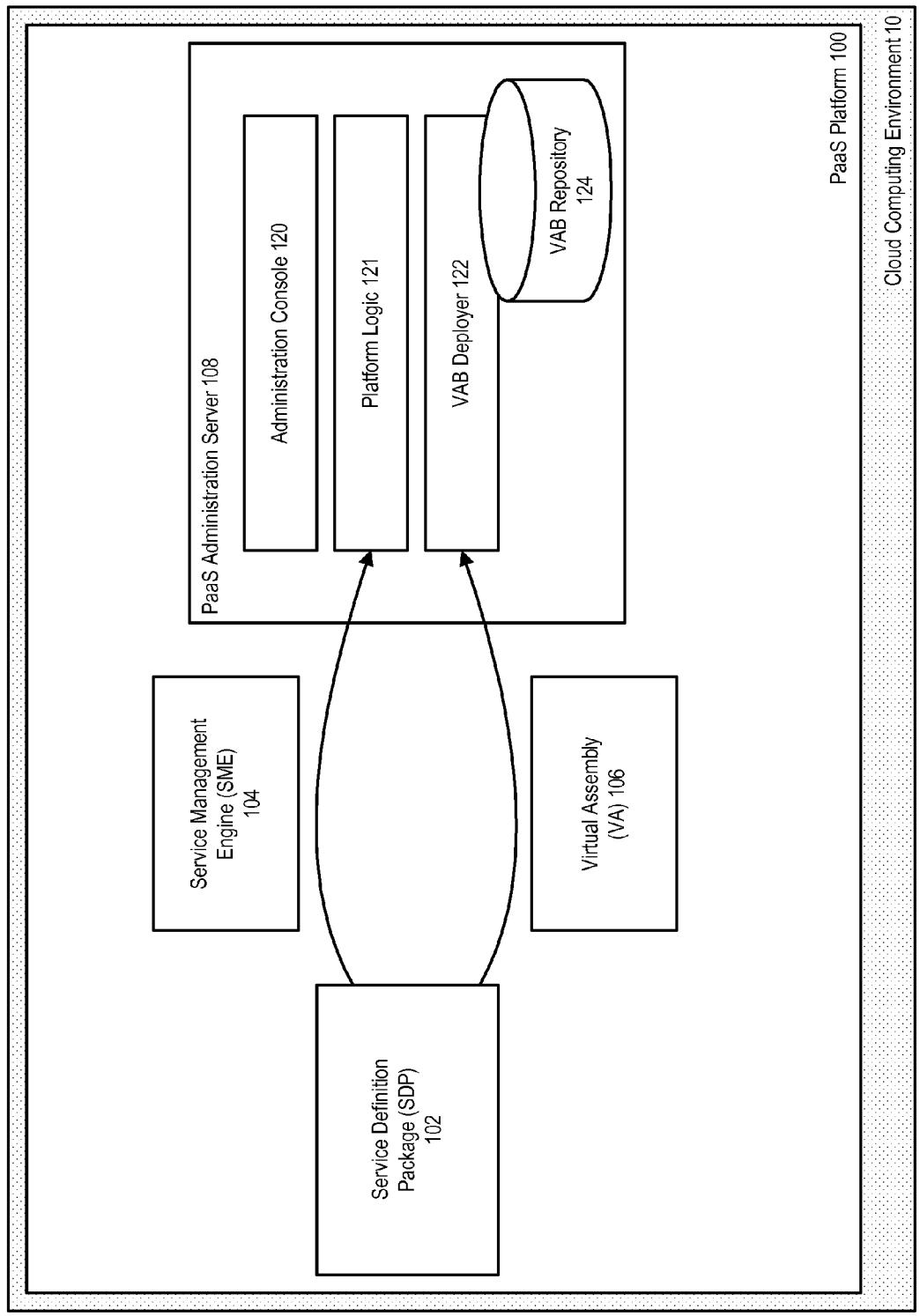
FIG. 3 illustrates the use of service definition packages and service management engines with an administration server, in accordance with an embodiment

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
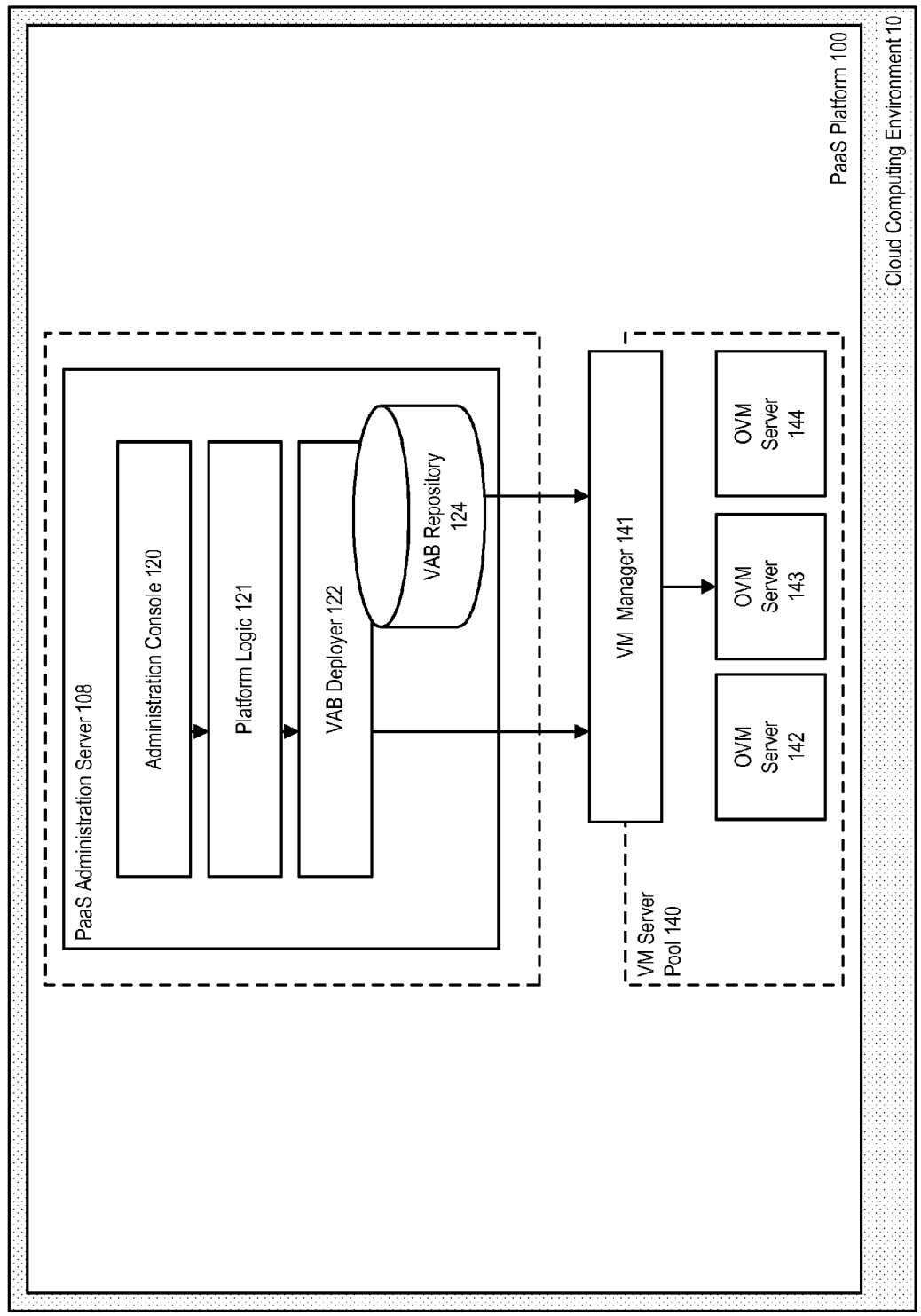
FIG. 4 illustrates the interaction between an administration server and a virtualization manager, in accordance with an embodiment

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
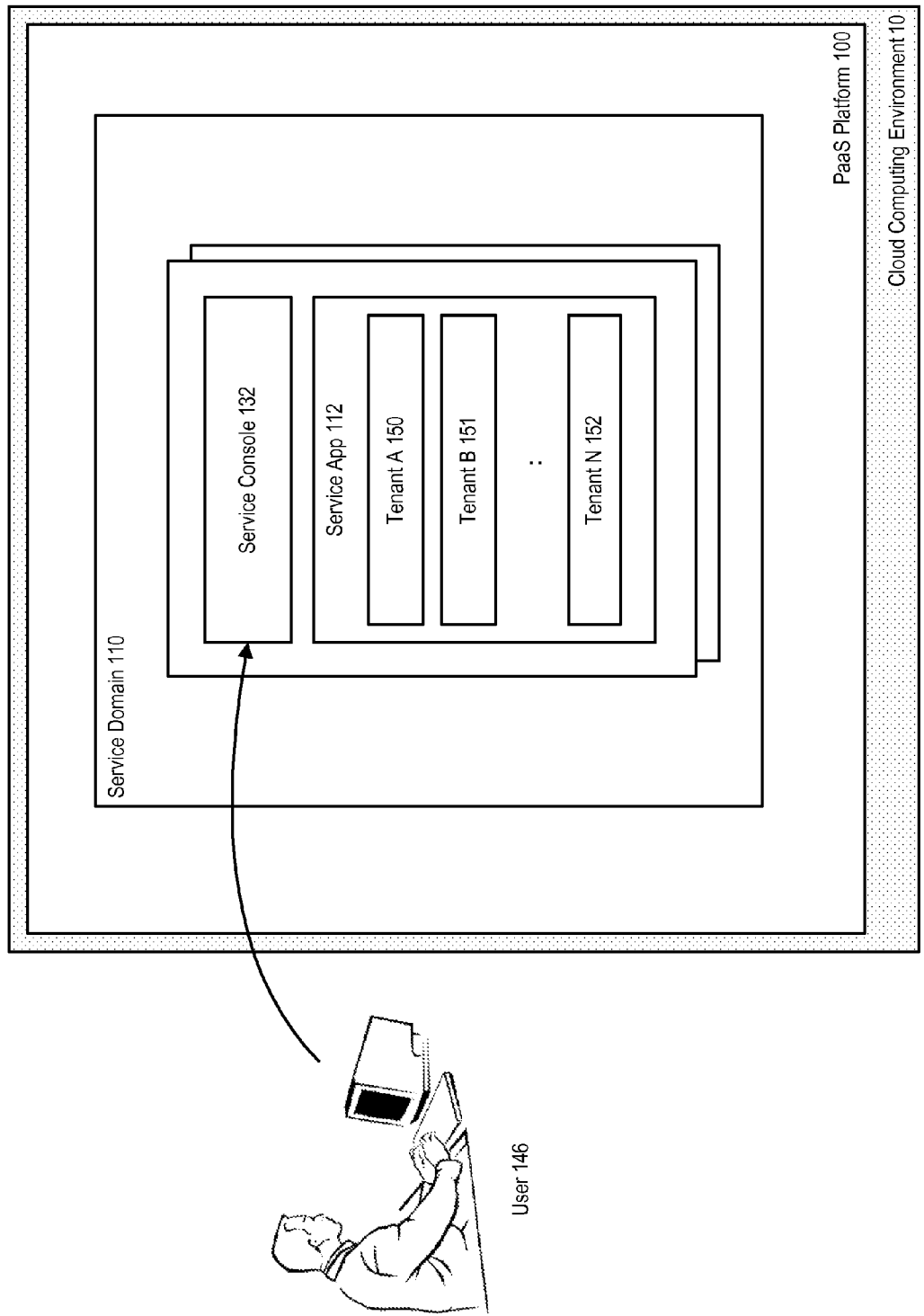
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
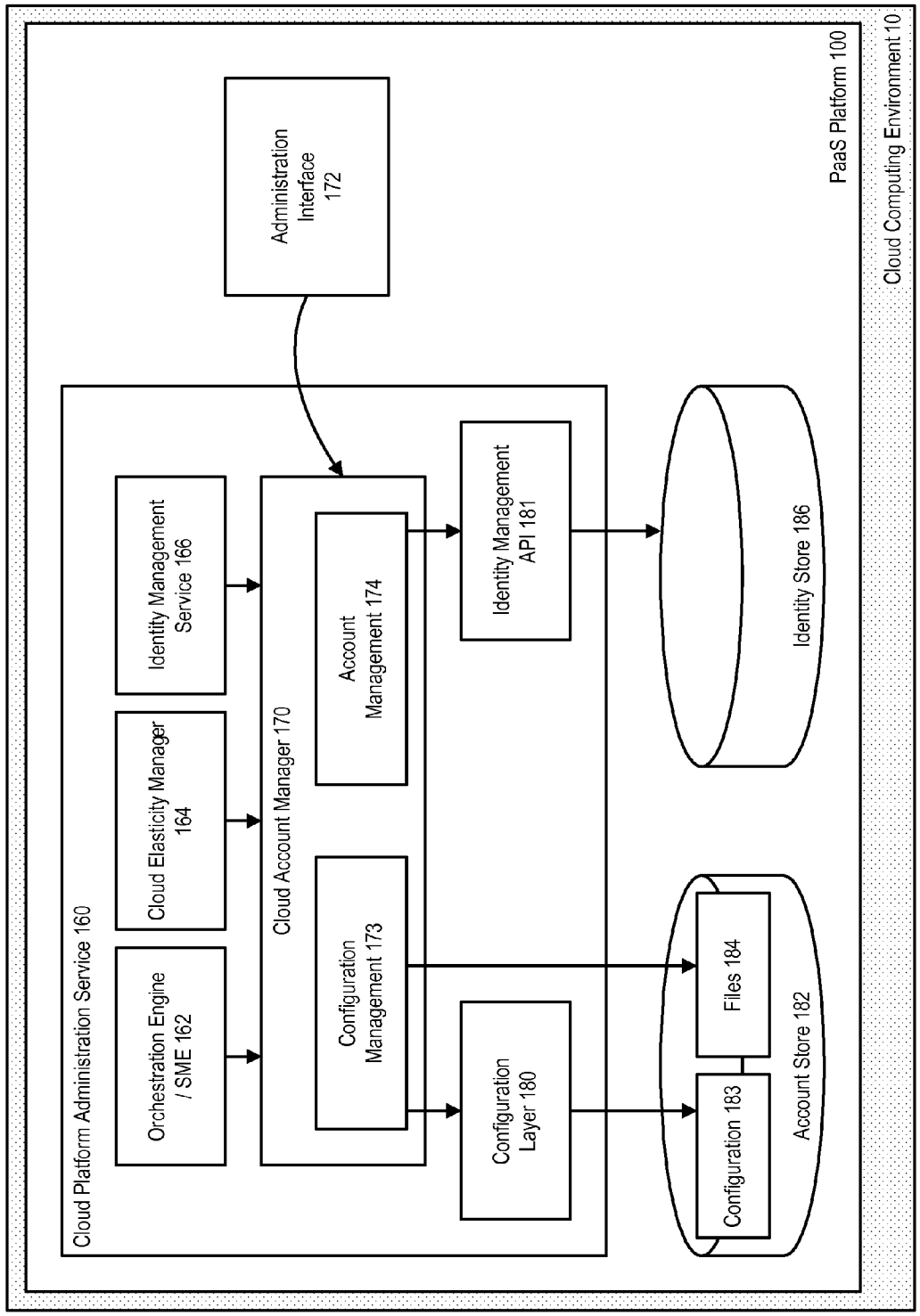
FIG. 6 illustrates a cloud account manager, in accordance with an embodiment

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
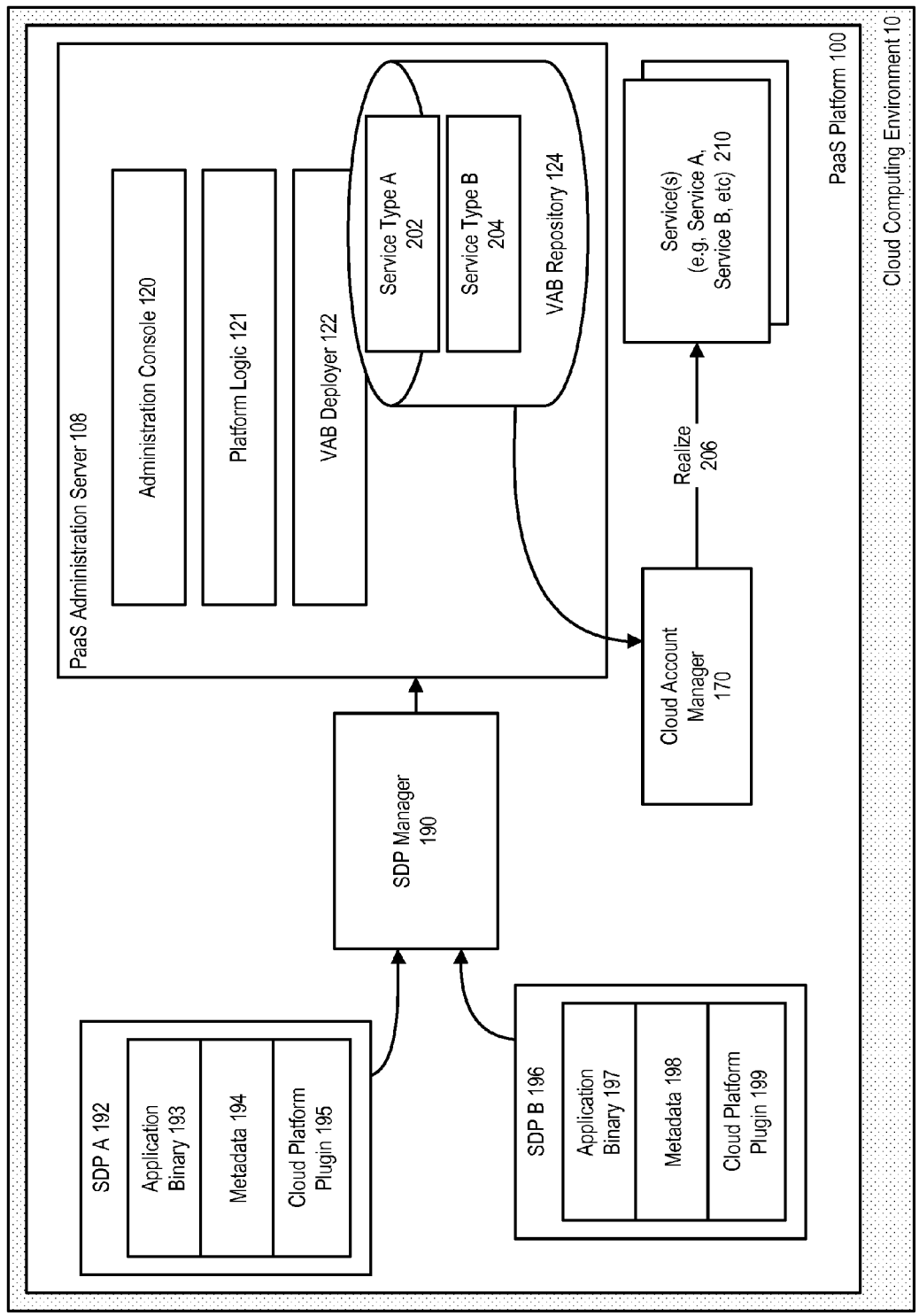
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
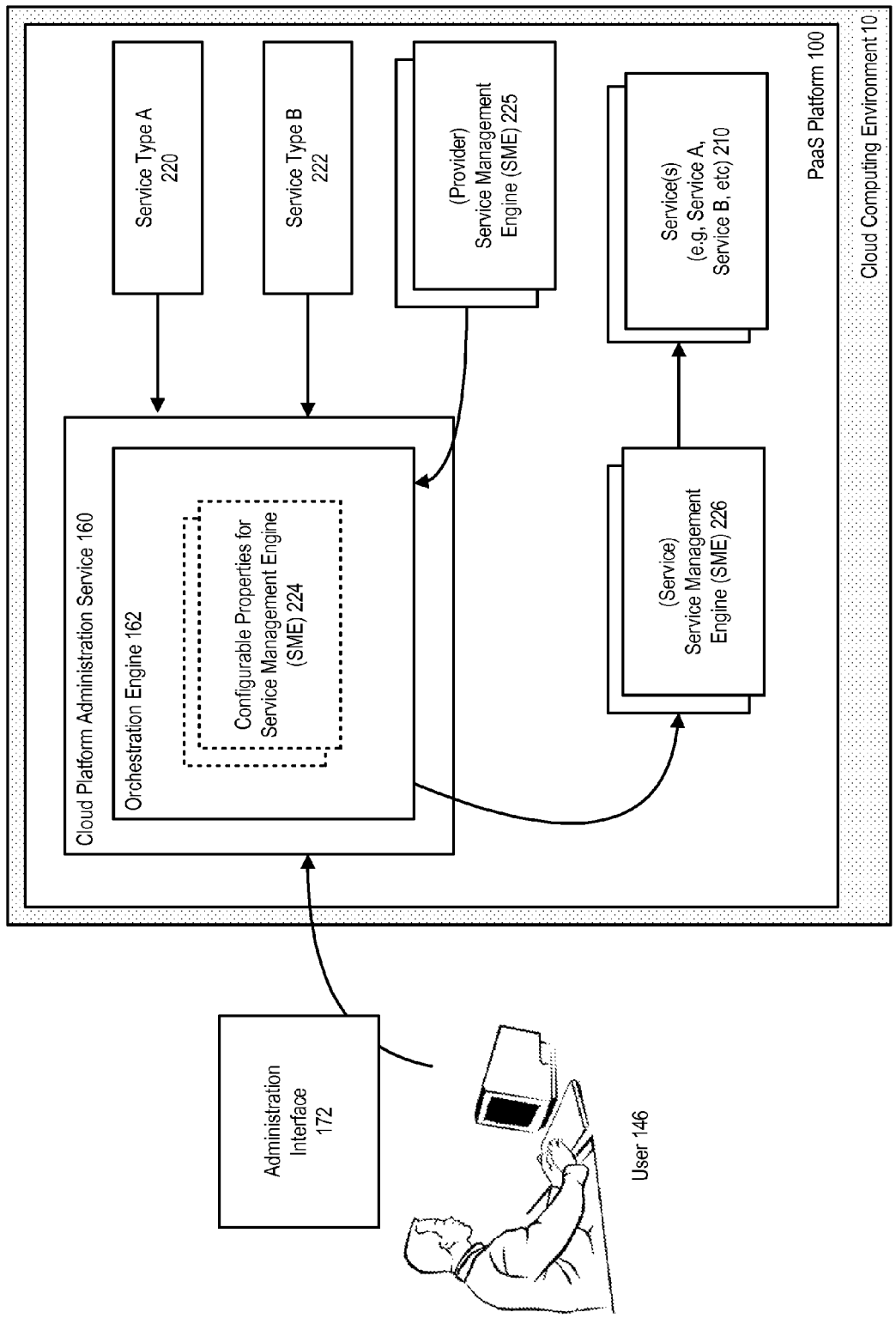
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
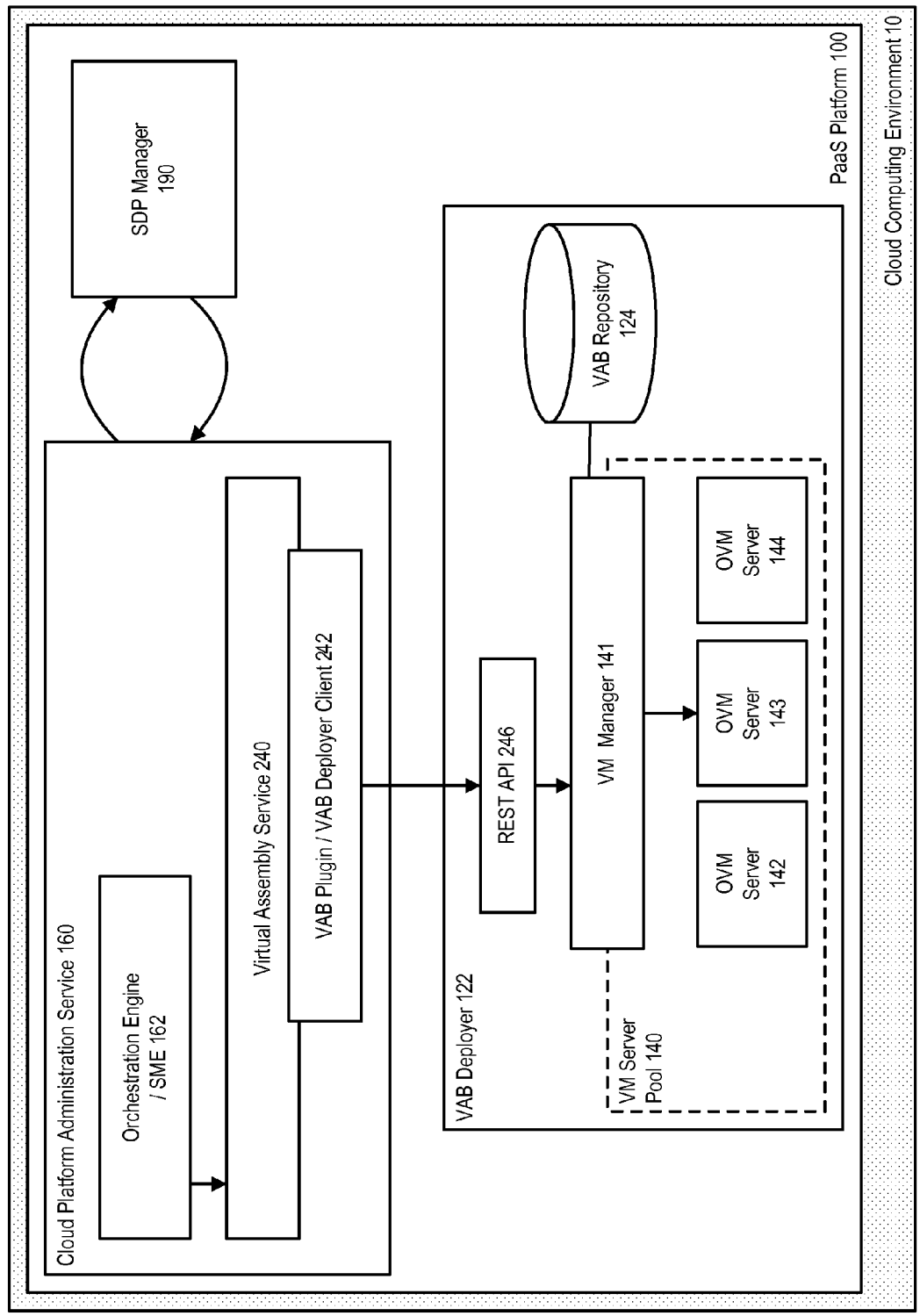
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
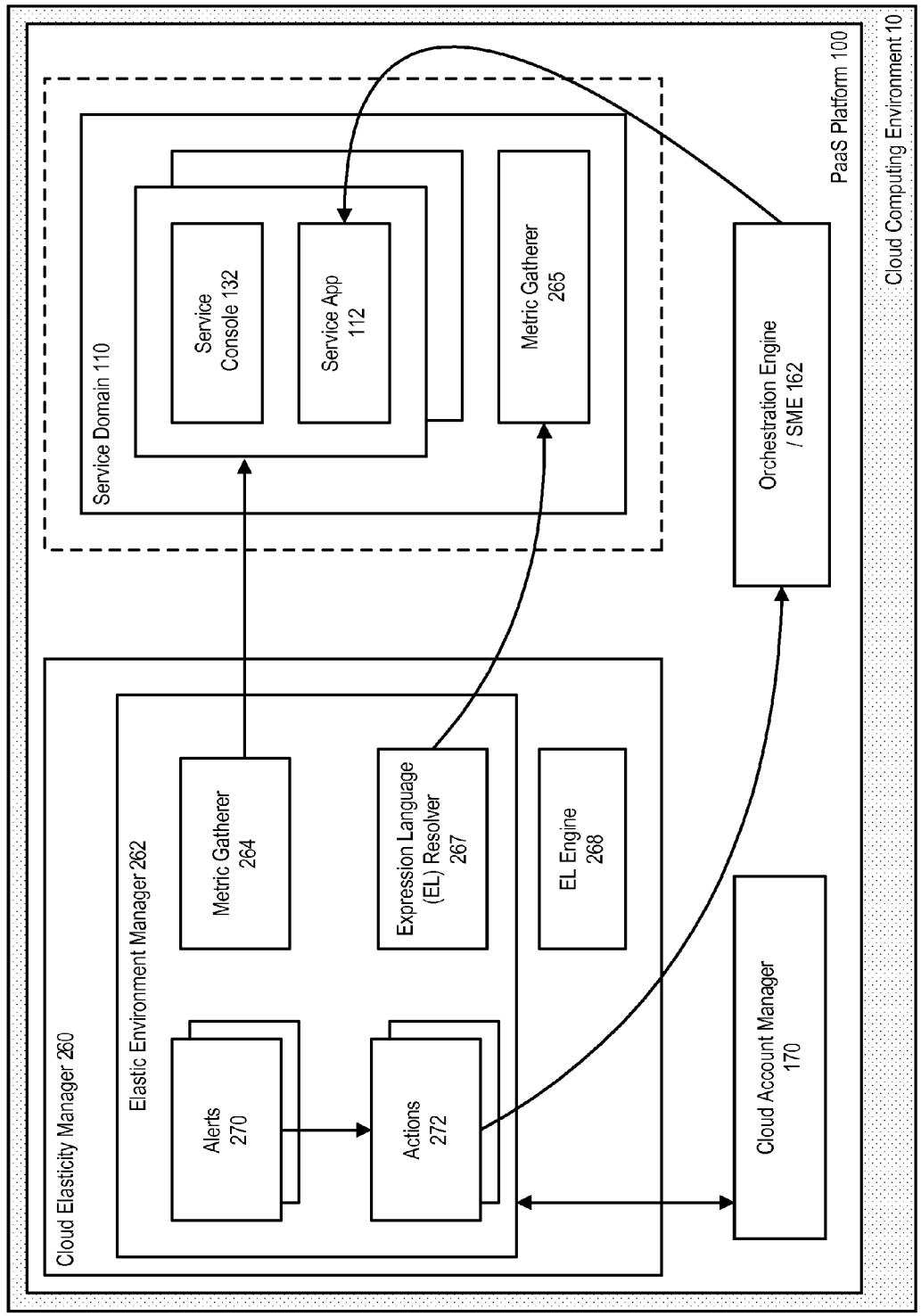
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

Physical Plug-in

As described above, a typical cloud computing environment may utilize a number of virtualized platforms deployed to one or more physical machines, and connected through a network such as the Internet. However, establishing a virtual environment for developing, evaluating, testing and demonstrating services for subsequent deployment within a cloud environment can be complex and require significant investment.

In accordance with an embodiment, described herein are systems and methods for simulating a cloud environment on a physical platform. In an embodiment, a physical assembly is provided within a cloud environment and a physical plug-in configured to provide a virtual assembly builder-like environment on a physical platform. The physical assembly is an installable software suite including software configured to support provisioning of applications for providing services. The physical plug-in is configured to enable installation of the physical assembly on the physical platform. The physical plug-in is also configured to enable support for administering the services of the cloud platform component via the software installed from the physical assembly.

In accordance with an embodiment, a system can comprise one or more physical plug-ins to simulate, on a physical platform, the deployment and administration of one or more services in a cloud. As used herein, the term "physical platform" refers to one or more computers that are not virtualized, i.e., one or more computers that have not been abstracted from a user by a hypervisor or other control program to mask the hardware from the user.

In accordance with an embodiment, the physical assembly is provided to the physical plug-in by the cloud environment via a virtual assembly service (VAS) application program interface (API). The VAS APIs allows new functionality to be plugged in without affecting existing interfaces. In an embodiment, the system provides one or more interfaces for administering assembly instances and/or patching assembly instances.

In accordance with an embodiment, the plug-in includes a local repository, which stores deployment information for the physical assembly. The deployment information can include a version number of the physical assembly, a number of assembly instances to be deployed, and deployment plan and configuration scripts for each assembly instance. The deployment information can further include state information of the assembly instance (e.g., whether it is deployed, started, stopped, undeployed, and failed) and details of patches applied to the assemblies. In accordance with an embodiment, the physical plug-in receives the physical assembly from the cloud environment and stores the physical assembly in the local repository.

In accordance with an embodiment, the physical plug-in includes a shell executor, which facilitates executions of scripts for a deployment phase of the installment of the physical assembly. For example, the shell executor can facilitate execute of scripts on any Unix or Windows platform. The physical plug-in can rely on an exit status of a script to determine a result of a script operation. The script executor also allows for logging operation results to logs and/or allows streaming output back to a caller.

In accordance with an embodiment, the physical plug-in is agnostic to the type of service provided. A new physical assembly for providing a new type of service can be created and deployed without modification to the physical plug-in.

In accordance with an embodiment, the physical plug-in need not require any extra operating system (OS) packages to be installed. The physical plug-in can run directly in an environment (e.g., a Unix environment). However, in accordance with embodiments where physical assemblies are deployed across multiple machines, the physical plug-in can use, e.g., OpenBSD Secure Shell (OpenSSH).

Figure 11:
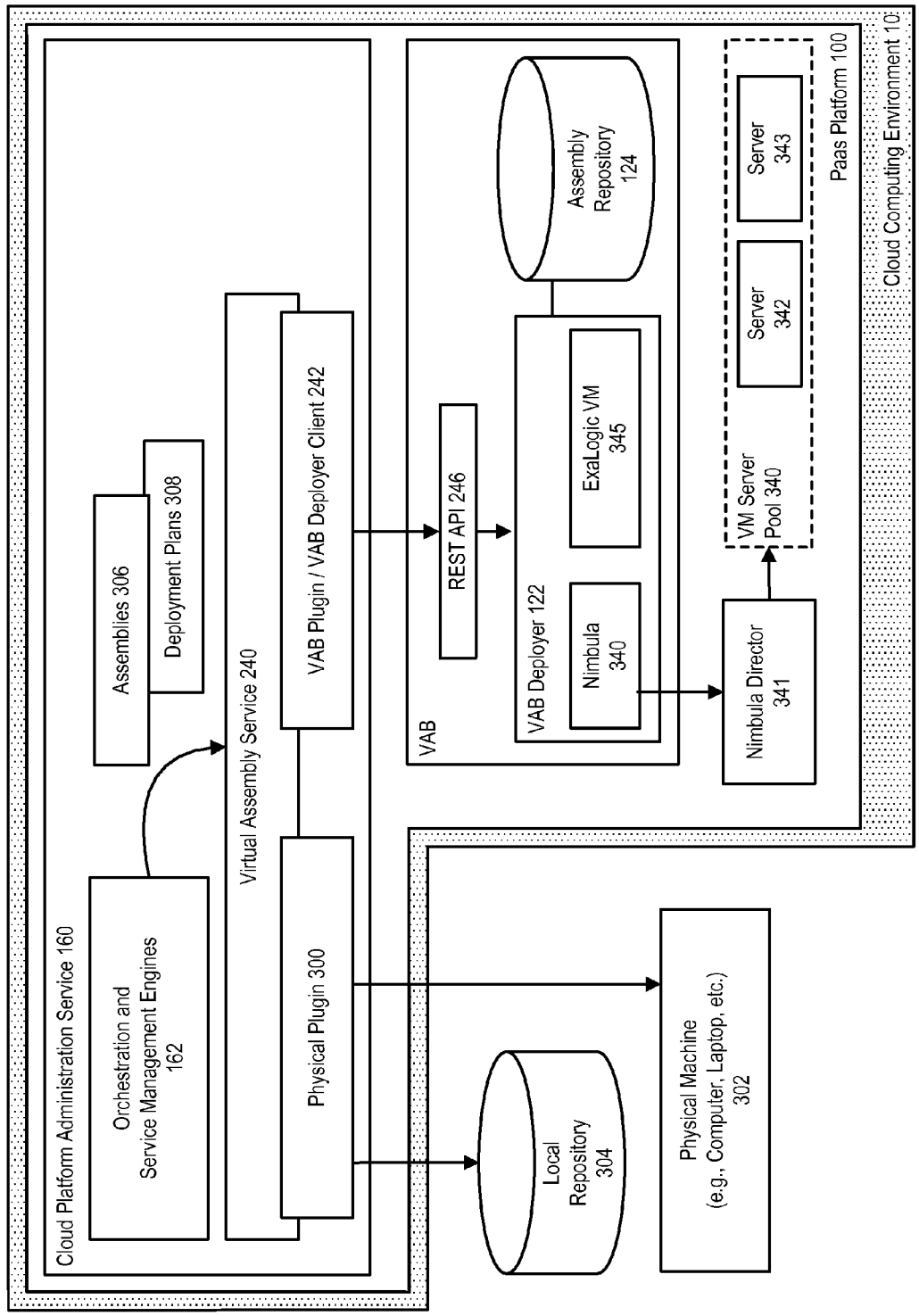
FIG. 11 illustrates a system which can simulating a cloud environment on a physical platform, in accordance with an embodiment.

FIG. 11 illustrates the use of a physical plug-in, in accordance with an embodiment. In accordance with an embodiment, a system can comprise one or more physical plug-ins that can implement the virtualization service interface to provide a VAB-like environment on a physical platform rather than in a virtualized environment. A physical plug-in can provide ease of deployment of CPAS features without having to depend on a backend target environment for assembly deployments. In some embodiments, a physical plug-in is also referred to as native mode.

In accordance with an embodiment, the physical plug-in can simulate integration of a physical platform with a virtualization provider, providing functionality directly on the physical platform rather than in a virtualized environment. Rather than creating virtual machines (VMs) from VM templates, starting and stopping VMs, and administering a service through its lifecycle, software having a predetermined deployment plan is installed on one or more physical machines, for example a personal computer running a native operating system (i.e., with no virtualization). Processes for running the service, e.g. a WebLogic server, can be deployed and a lifecycle of the service can be administered directly on the physical platform. In this manner, the physical plug-in can allow a user to run a software stack without setting up a virtualization subsystem.

Use of a physical plug-in in accordance with embodiments can provide several benefits to a user, such as allowing the user to evaluate and/or demonstrate a deployment, or allowing the user to avoid the complexity of setting up a virtualization subsystem. However, the physical plug-in can also be used in a cloud environment to provide services to a client, and need not be limited to use in isolation from the client. A physical platform can potentially perform services more quickly than a virtualized environment. However, as described above, use of a physical platform to provide services to a client can potentially increase costs. Additionally, virtualization typically provides greater isolation between services that are deployed than a physical platform, since the services in a virtualized environment run their own VM, and are therefore highly partitioned. On a physical platform, if a pool of machines is shared by tenants, isolation is not as well controlled.

As shown in FIG. 11, in accordance with an embodiment, a physical platform including one or more physical machines 302 can interact with a virtualization service 240 via the physical plug-in 300. In accordance with an embodiment, the physical plug-in can implement a portion of the virtualization API, and comprises a local repository 304. The physical plug-in can obtain assemblies 306 and deployment plans 308 from the virtual layer for deployment on the physical platform.

FIG. 11 further illustrates exemplary software products usable with the VAB for creating and managing VMs in the virtualized environment, however, the physical plug-in need not interact with the VAB. In accordance with an embodiment, products such as Nimbula 340 (which includes Nimbula Director 341) and Oracle Exalogic 345, can be selectively used to deploy and manage VMs in the virtualized environment.

In accordance with an embodiment, a physical plug-in can provide a means to deploy assemblies on a physical machine through the VAS APIs. The VAS need not administer services. Rather, the administrative tools of a provisioned service can be used to administer the service. The VAB can also have physical mode functionality, but generally uses a virtualization software package, e.g. Oracle VirtualBox, for the provisioning of appliances of deployed assemblies.

In some embodiments, a physical plug-in can also include the capability to deploy assemblies in a multi-machine setup. In such a mode, appliance instances can be distributed across multiple physical machines.

In accordance with an embodiment, an appliance represents a software component and its local execution environment. For example, an appliance can include an application configuration, binaries, and operating system. An assembly is a collection of interrelated appliances that are configured to work together upon deployment to a pool of hardware resources. Assemblies can also provide capabilities that increase their usefulness in a production environment, such as support for externalized configuration in the form of metadata; a means of defining a start order of appliances to reflect interdependencies; and/or support for referencing external systems such as databases, servers, or security providers.

In accordance with an embodiment, the physical plug-in simulates VAB-like functionality in a non-virtualized environment via the contents of a physical assembly and the deployment of the physical assembly. While the VAB can capture software component information from a reference environment using introspection plug-ins, the physical plugin does not provide introspection of already deployed software components. A physical assembly can be created manually by an assembler packaging an SDP for the physical plug-in. The assembler can package the native software components into an assembly archive. A set of scripts to provision, configure, and manage services can also be packaged into the assembly archive (where managing a service can include lifecycle management, e.g., starting and stopping a service).

In accordance with an embodiment, an assembler configures software for various types of services, such as Java Service, Database service etc. The scripts include shell scripts that can be run on an operating system, for example Unix or Windows operating systems.

In accordance with an embodiment, in native mode an appliance is represented by the physical machine where the service is provisioned. When an assembly instance is deployed, a target number of appliance instances for each appliance is started. The initial target for each appliance is specified in a deployment plan. A new target can be configured as part of scaling operation. The physical plug-in need not monitor the health of the running appliance instances, but can return the success or failure of a deployment operation.

In accordance with an embodiment, the physical plug-in can comprise a local repository and a shell executor.

As described above, SDPs contains data about a service, similar to an installer. In a virtualized environment the analogous type of artifacts may be stored in the virtualization provider. In accordance with an embodiment, deployment information usable with a physical plug-in is stored in the local repository. For example, the deployment information can be stored in a global account (i.e. SYSTEM) store of a Cloud Account Manager (CAM). The deployment information can include information about the version of the assembly and the number of assembly instances, along with the deployment plan and configuration scripts for each assembly instance. The deployment information can further include state information of the assembly instance (e.g., deployed, started, stopped, undeployed, and failed), in addition to details of patches applied to the assemblies.

In accordance with an embodiment, the file layout of the local repository can resemble that of a repository maintained under each VAB deployer instance. The local repository can be shared by all of the physical provider configurations, and can further include one or more folders for storing files needed for patching of services.

In accordance with an embodiment, a shell executor can facilitate execution of scripts in an operating system. In the case of Windows operating system, for example, execution of batch scripts and Cygwin shell scripts can be supported. The physical plug-in provides a means to perform operations for deployment of a software system (i.e., a service) defined by an assembly archive. The shell executor executes the script for the deployment phase and is agnostic to the type of service that is being configured.

Because the physical plug-in is agnostic to the type of service provided, a new physical assembly for providing a new type of service can be created and deployed without modification to the physical plug-in. The plug-in facilitates a way to pass configuration parameters to the script by way of writing the configuration parameters in name/value pairs to an initialization file which can be sourced into the scripts. The configuration parameters typically are derived from the deployment plan which in turn is created based on user configuration information in the SDP.

In accordance with an embodiment, the VAS layer uses an initialization file to pass parameters to a script. The script therefore can source the initialization file from the first argument, which points to an absolute path to the initialization file. The properties of the deployment plan are translated to shell variables and parameters in the initialization script. The initialization script does not perform command execution or other type of initialization, but intead contains the name/value pairs.

In accordance with an embodiment, the physical plug-in relies on an exit status of a script to determine the result of any script operation. As a result, a script should be robust enough to handle possible error conditions. If a script does not handle failure cases, incorrect provisioning/unprovisioning of a service can result. For example, if all appliance instances are not stopped during the stopping of a service, orphan processes can result.

In accordance with an embodiment, the output of scripts can be logged to the server log. Some services may have lengthy installation times. The shell executor can allow for configuring a timeout property for completion of long running operations. For example, the shell executor can allow for a default run time of 2 minutes.

In accordance with an embodiment, each service creation results in the installation of software pertaining to the service. A mechanism can be provided for managing multiple service software installations. The physical plug-in allows for configuring a global installation directory under which a service is installed. The directory can be specified while configuring the virtualization provider. Installation directory management occurs in the VAS layer and not in SME. The VAS layer can then communicate the install location back to the SME.

In accordance with an embodiment, a deployment plan comprises a file that is used to customize certain properties in order to proceed with a successful deployment. Property names can be based, for example, on standard shell variable naming conventions since the properties are translated to shell variables used in the configuration scripts. There are two deployment plans involved in creating a service: a static deployment plan and a runtime deployment plan.

In the case of VAB, a static deployment plan is created by an introspection plug-in. Because the physical plug-in does not support introspection plug-ins, the physical assembly bundles a static deployment plan which describes an appliance and its members. An SME can download the static deployment plan and customize it according to the deployment needs.

In accordance with an embodiment, a runtime deployment plan is customized and can be used to override the base (i.e., default) configuration properties of a deployed service. User configuration management via deployment plans is managed by the SME plug-in and the VAS is not involved in any operations related to deployment plans except extracting the deployment plan properties and creating an initialization parameters file. The deployment plan schema can be the same as that specified by the VAB.

In accordance with an embodiment, remote machine support includes the creation and management of appliance instances across multiple machines. Remote machine support can use secure shell (SSH) protocol for performing operations on remote machines. The machines can be configured for SSH public key authentication, allowing for password-less login to the machines. SSH key setup can occur when the virtualization provider is configured. The machine environments are homogeneous, for example having the same SSH user for all machines, and having the same global install directory.

In accordance with an embodiment, the physical plug-in can use a simple round robin mechanism to distribute appliance instances across multiple remote machines. The actual remote provisioning occurs through the configuration scripts. The physical plug-in creates a file containing information on where to create a particular appliance instance. The scaling script parses the information and creates services accordingly.

In accordance with an embodiment, the physical plug-in exposes various statistics to monitor the state of the physical plug-in. Statistics can be collected per physical configuration.

In accordance with an embodiment, the physical plug-in configuration is limited to creating a VAS service configuration for local or remote machines.

Figure 12:
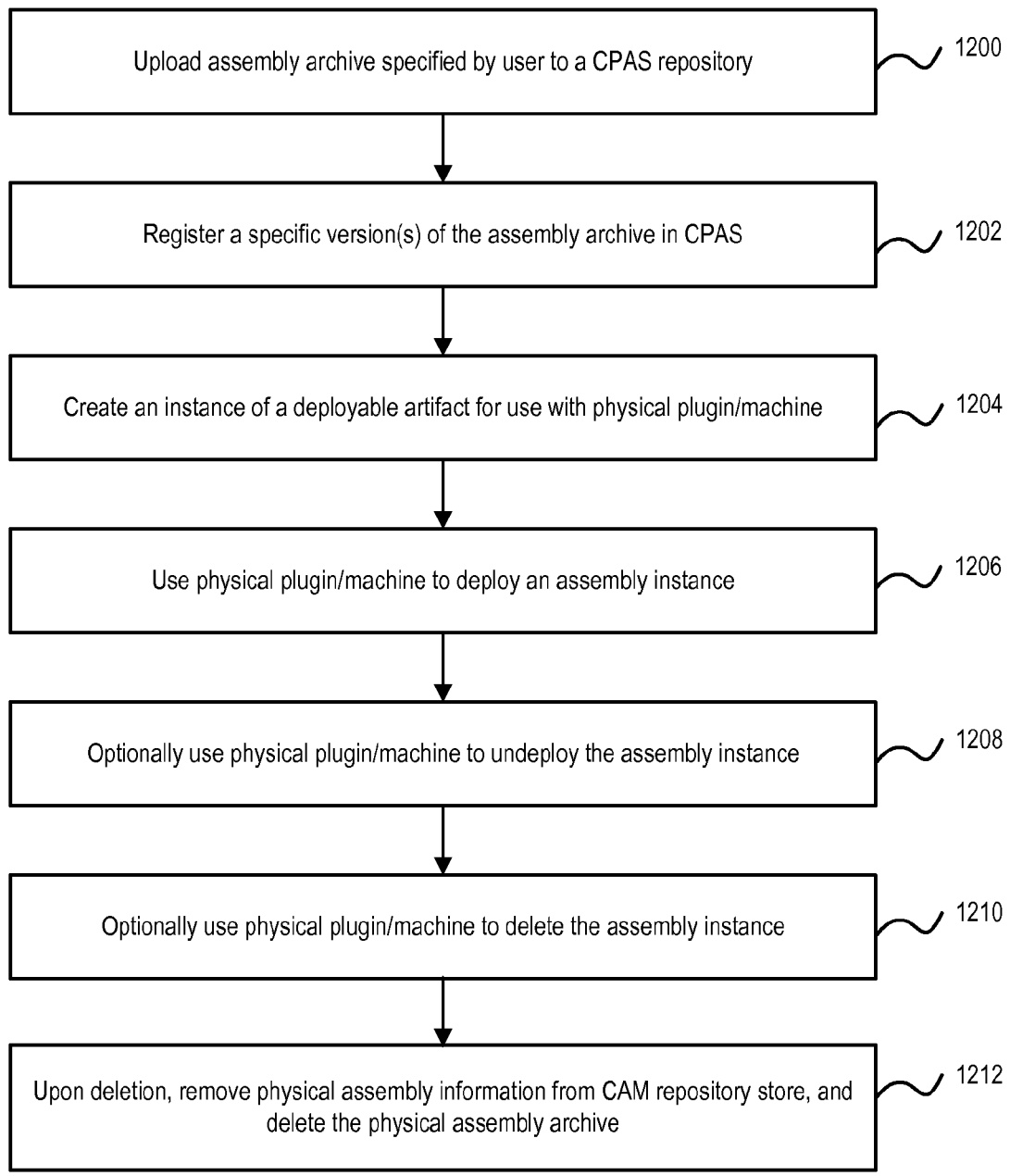
FIG. 12 illustrates a flowchart for a work flow describing assembly-style deployment and undeployment via a physical plug-in, in accordance with an embodiment.

FIG. 12 is a flowchart for a work flow in accordance with an embodiment, the work flow describing assembly-style deployment and undeployment via a physical plug-in. As shown in FIG. 12, in accordance with an embodiment, at step 1200, a user specified assembly archive is re 12, uploaded to a CPAS repository and is tagged with a version number. The resulting upload version number is returned to the user.

At step 1202, a specific version of archive is registered in CPAS. It is also possible to register multiple versions of the same assembly archive.

At step 1204, an instance of deployable artifact is created. Creating the instance includes preparing for deployment by extracting all the configuration scripts and storing the deployment plan of the assembly. The creating operation results in returning an instance ID to the user.

At step 1206, deploying an assembly instance will result in creation of init params script from the deployment plan and actual execution of the config scripts install.sh to provision the service and start.sh to start the service.

At step 1208, a service that is no longer in use can be undeployed. Undeploying an assembly instance will stop the running service and uninstall the service from the system. In accordance with an embodiment, at step 1210, the undeploying operation can cleanup files created during the creation of the assembly instance.

At step 1212, physical assembly information is removed from a CAM repository store. In accordance with an embodiment, the physical assembly archive is then deleted from the CAM repository store).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for simulating a cloud environment on a physical computing platform, comprising:
   one or more computers providing a virtualized computing platform including a cloud environment executing thereon;
   a service definition package that includes a configuration information that defines a type of service offered by the cloud environment;
   an assembly component provided within the cloud environment as an installable software suite, wherein the assembly component includes software configured to support provisioning of applications for providing the service; and
   a plug-in configured to
      provide a virtual assembly builder environment on a physical computing platform comprising a physical computing machine,
      enable installment of the assembly component on the physical computing platform, and
      enable support for administering the assembly component and simulating the cloud environment and the service on the physical computing platform, including that the plug-in
         receives the assembly component from the cloud environment, and determines a deployment information for the assembly component based on the configuration information provided by the service definition package,
         stores the deployment information associated with the assembly component received from the cloud environment, in a local repository associated with the plug-in, and
         simulates the administering of the service, by deploying and running processes within a lifecycle of the service directly on the physical computing platform.

2. The system of claim 1, wherein the assembly component is provided to the plug-in by the cloud environment via a virtual assembly service (VAS) application program interface (API).

3. The system of claim 1, wherein the system provides one or more interfaces for administering assembly instances and/or patching assembly instances.

4. The system of claim 1,
   wherein the plug-in includes the local repository;
   wherein deployment information for the assembly component is stored in the local repository;
   wherein the deployment information includes one or more of a version number of the assembly component, a number of assembly instances to be deployed, deployment plan and configuration scripts for each assembly instance, state information of each assembly instance and details of patches applied to each assembly instance.

5. The system of claim 4, wherein the plug-in receives the assembly component from the cloud environment and stores the assembly component in the local repository.

6. The system of claim 4,
wherein the plug-in includes a shell executor;
wherein the shell executor facilitates executions of scripts for a deployment phase of the installment of the assembly component.

7. A method of simulating a cloud environment on a physical platform, comprising:
providing, within a cloud environment operating on a virtualized platform executing on one or more computers,
a service definition package that includes a configuration information that defines a type of service offered by the cloud environment, and
an assembly component as an installable software suite, wherein the assembly component includes software configured to support provisioning of applications for providing the service; and
providing a plug-in configured to
provide a virtual assembly builder environment on a physical computing platform comprising a physical computing machine,
enable installment of the assembly component on the physical computing platform, and
enable support for administering the assembly component and simulating the cloud environment and the service on the physical computing platform, including that the plug-in
receives the assembly component from the cloud environment, and determines a deployment information for the assembly component based on the configuration information provided by the service definition package,
stores the deployment information associated with the assembly component received from the cloud environment, in a local repository associated with the plug-in, and
simulates the administering of the service, by deploying and running processes within a lifecycle of the service directly on the physical computing platform.

8. The method of claim 7, further comprising:
installing the assembly component on the physical platform;
wherein installing the assembly component includes installing applications for providing one or more services; and
administering the one or more services via the software installed from the assembly component.

9. The method of claim 7, wherein the assembly component is provided to the plug-in by the cloud environment via a virtual assembly service (VAS) application program interface (API).

10. The method of claim 7, further comprising:
providing one or more interfaces for administering assembly instances and/or patching assembly instances.

11. The method of claim 7, wherein the plug-in includes the local repository, the method further comprising:
storing deployment information for the assembly component in the local repository associated with the plug-in;
wherein the deployment information includes one or more of a version number of the assembly component, a number of assembly instances to be deployed, deployment plan and configuration scripts for each assembly instance, state information of each assembly instance and details of patches applied to each assembly instance.

12. The method of claim 11, the method further comprising:
receiving assembly component from the cloud environment for storage in the local repository.

13. The method of claim 11, wherein the plug-in includes a shell executor, the method further comprising:
executing, via the shell executor, scripts for a deployment phase of the installment of the assembly component.

14. A non-transitory computer readable storage medium, including instructions stored thereon which when read and executed by one or more computers cause the one or more computers to perform the steps comprising:
providing, within a cloud environment operating on a virtualized platform executing on one or more computers,
a service definition package that includes a configuration information that defines a type of service offered by the cloud environment, and
an assembly component as an installable software suite, wherein the assembly component includes software configured to support provisioning of applications for providing the service; and
providing a plug-in configured to
provide a virtual assembly builder environment on a physical computing platform comprising a physical computing machine,
enable installment of the assembly component on the physical computing platform, and
enable support for administering the assembly component and simulating the cloud environment and the service on the physical computing platform, including that the plug-in
receives the assembly component from the cloud environment, and determines a deployment information for the assembly component based on the configuration information provided by the service definition package,
stores the deployment information associated with the assembly component received from the cloud environment, in a local repository associated with the plug-in, and
simulates the administering of the service, by deploying and running processes within a lifecycle of the service directly on the physical computing platform.

15. The non-transitory computer readable storage medium of claim 14, further including instructions stored thereon which when read and executed by one or more computers cause the one or more computers to perform the steps further comprising:
installing the assembly component on the physical platform;
wherein installing the assembly component includes installing applications for providing one or more services; and
administering the one or more services via the software installed from the assembly component.

16. The non-transitory computer readable storage medium of claim 14, further including instructions stored thereon which when read and executed by one or more computers cause the one or more computers to perform the steps further comprising:

storing deployment information for the assembly component in the local repository associated with the plug-in;

wherein the deployment information includes one or more of a version number of the assembly component, a number of assembly instances to be deployed, deployment plan and configuration scripts for each assembly instance, state information of each assembly instance and details of patches applied to each assembly instance.

17. The non-transitory computer readable storage medium of claim 14, further including instructions stored thereon which when read and executed by one or more computers cause the one or more computers to perform the steps further comprising:

receiving assembly component from the cloud environment for storage in the local repository.

18. The non-transitory computer readable storage medium of claim 14, further including instructions stored thereon which when read and executed by one or more computers cause the one or more computers to perform the steps further comprising:

executing, via the shell executor, scripts for a deployment phase of the installment of the assembly component.

19. The system of claim 1, wherein the plug-in enables processes for running the service to be deployed within the lifecycle of the service and administered directly on the physical computing platform.

20. The method of claim 7, wherein the plug-in enables processes for running the service to be deployed within the lifecycle of the service and administered directly on the physical computing platform.

\* \* \* \* \*

UNITED STATES PATENT AND TRADEMARK OFFICE
CERTIFICATE OF CORRECTION

PATENT NO. : 9,612,817 B2  Page 1 of 1
APPLICATION NO. : 14/515347
DATED : April 4, 2017
INVENTOR(S) : Balasubramanyam et al.

It is certified that error appears in the above-identified patent and that said Letters Patent is hereby corrected as shown below:

In the Specification

In Column 2, Line 13, after "embodiment" insert -- . --.

In Column 2, Line 16, after "embodiment" insert -- . --.

In Column 2, Line 20, after "embodiment" insert -- . --.

In Column 3, Line 58, delete "Accordance" and insert -- accordance --, therefor.

In Column 3, Line 58, delete "Embodiment, a Sub-Tenant" and insert -- embodiment, a sub-tenant --, therefor.

In Column 3, Line 59, delete "Entity that Exists Under" and insert -- entity that exists under --, therefor.

In Column 16, Line 8, delete "intead" and insert -- instead --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*